Figure 3:
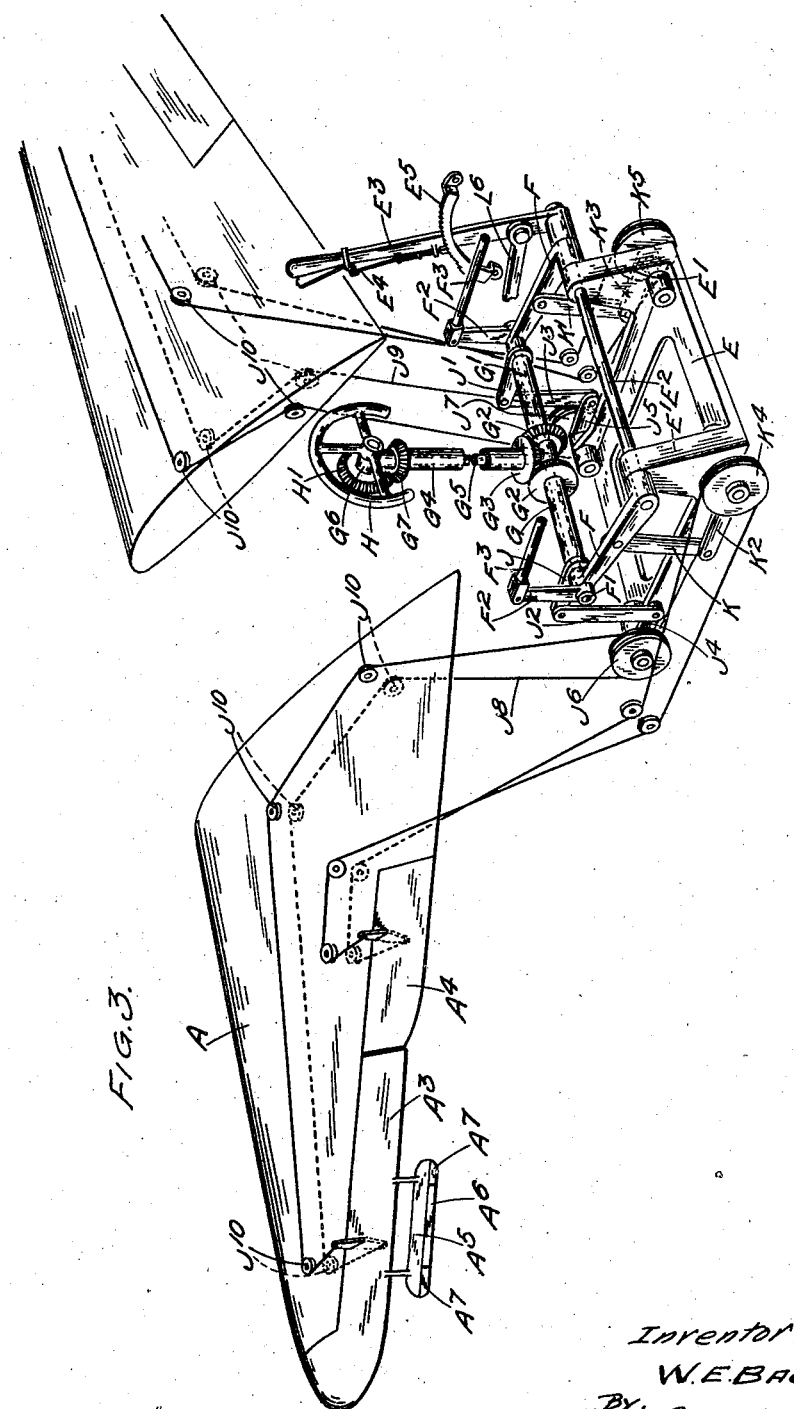

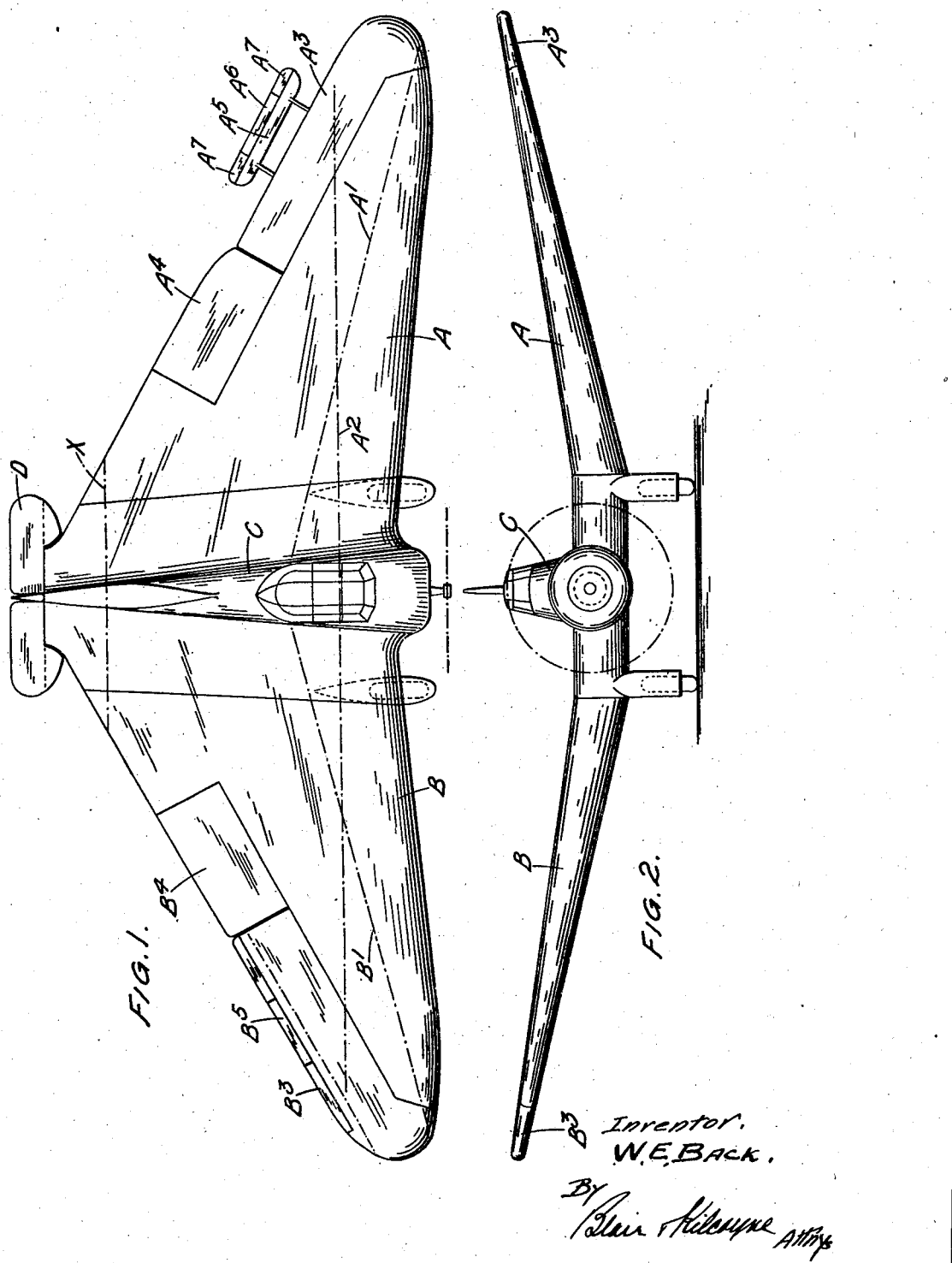

Feb. 27, 1940.  W. E. BACK  2,191,842
AIRPLANE AND CONTROL APPARATUS THEREFOR
Filed March 8, 1938  3 Sheets-Sheet 2

Inventor.
W. E. BACK.
By,

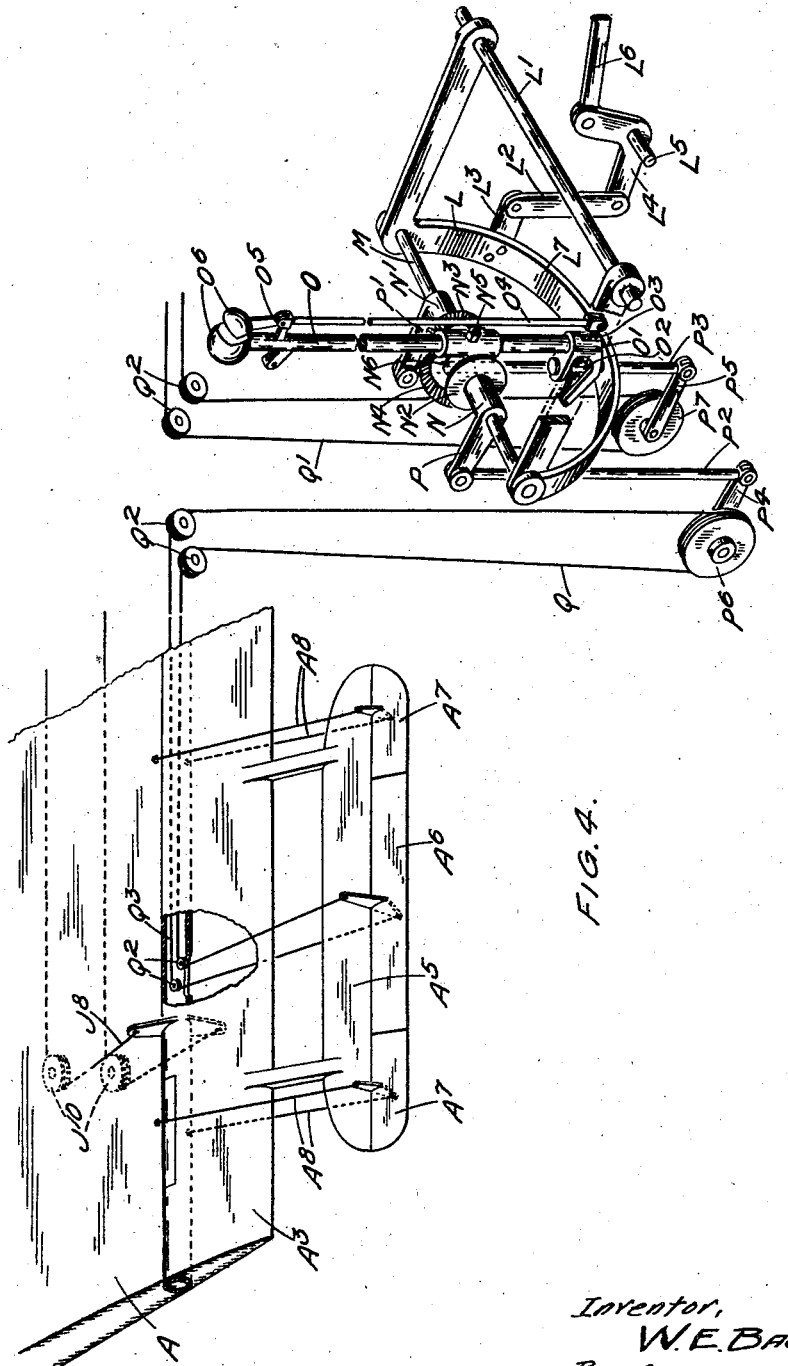

Patented Feb. 27, 1940

2,191,842

UNITED STATES PATENT OFFICE 2,191,842

AIRPLANE AND CONTROL APPARATUS THEREFOR

William Edward Back, Oulton Broad, Suffolk, England

Application March 8, 1938, Serial No. 194,663
In Great Britain March 13, 1937

9 Claims. (Cl. 244—75)

This invention relates to airplanes and control apparatus therefor and has for its object to provide an improved airplane which will be of compact form, will be capable of being manoeuvred with rapidity and generally will fulfill practical requirements.

An airplane according to the present invention comprises main wings so constructed that the centre of pressure of the outer portion of each wing lies in advance of the centre of gravity of the machine, while the centre of pressure of the inner portion lies in rear of this centre of gravity, ailerons (hereinafter called "outer ailerons") on the outer portions of the wings and one or more pivoted control surfaces (hereinafter termed "after-control surfaces") situated in rear of the centre of gravity.

The after control surfaces may be constituted by additional or "inner" ailerons or wing flaps pivoted to the inner portions of the wings but are preferably constituted by a one-piece or divided central tail plane or elevator lying immediately behind the inner portions of the wings or by one or a pair of tail elevators pivoted to a one-piece central tail plane.

In any case, the main control mechanism is preferably such that when moved to control longitudinal balance it moves the outer ailerons in an opposite sense to the after control surface or surfaces.

In addition to the outer ailerons and the after control surfaces, wing flaps may be provided on the parts of the wings adjacent to the outer ailerons, that is the part of each wing at which the centre of pressure lies close to or in line with the centre of gravity, separate control means being provided whereby these wing flaps can be moved to vary the effective camber of the wings or for air braking or both. Again, whether such wing flaps are provided or not, separate control mechanism may be provided which moves the outer ailerons with or without similar movement of the after control surfaces, independently of any movement of the main control mechanism, to vary the effective camber of the wings and in such an arrangement when wing flaps are provided the same independent control mechanism will also operate the wing flaps in the same sense as the outer ailerons.

With a view to increasing the inherent longitudinal stability of the machine, the angle of incidence of the outer part of each main wing may be somewhat greater than that of the inner part while the inner parts of the wings may be shaped so that the trailing edge portions exert little or no lifting effort but act merely as longitudinal stabilising surfaces.

If desired, each outer aileron may have pivoted to its trailing edge, preferably on struts rigid with and projecting rearwardly from this trailing edge, a servo vane or vanes, that is to say an aerofoil which, when moved about its pivot, exerts a force on the outer aileron to cause movement thereof.

Again in some cases each outer aileron may have formed on or rigidly connected to its trailing edge, preferably on struts, a governing plane, that is to say a small aerofoil which is normally in equilibrium in the air stream, and in this case servo vanes may be hinged to the trailing edges of the governing planes.

The control mechanism for the servo vanes which will hereinafter be called the servo control mechanism may be arranged in various ways. Thus, in a simple arrangement, the servo control mechanism may comprise control members so connected to a fixed part that when either outer aileron is moved by the main control mechanism, its servo vane is automatically moved in the opposite sense so as to assist the desired movement of the outer aileron.

Alternatively, the servo control mechanism may be an independent control mechanism under the control of the pilot, in which case this servo control mechanism is conveniently arranged so that the vanes on the two outer ailerons can be moved differentially to cause movement of such ailerons to control lateral balance, or in the same sense to cause movement of the ailerons to control longitudinal balance. Further, in such an arrangement, means may be provided for locking the servo control mechanism so that forces acting on the servo vanes due to a variation in the angle of incidence of the airstream caused by a variation in the longitudinal balance of the machine will tend to cause movement of the outer ailerons to return the machine to its original condition of longitudinal balance whereby longitudinal stability is assisted. In such an arrangement means may be provided for locking the servo control mechanism in two or more positions according to the conditions of flight which it is desired to maintain automatically.

Again, the servo control mechanism may be actuated, for example through further servo mechanism, by automatic control apparatus of the gyroscopic or like type (hereinafter called a robot pilot).

Further, in some cases each aileron may have associated therewith two or more servo vanes at least one of which is connected to servo control mechanism under the control of the pilot while at least one is so connected to a fixed part that on movement of the aileron, the servo vane is automatically moved in the opposite sense so as to assist the movement of the aileron.

It will be understood that since the outer ailerons are in effect interconnected and connected with the after control surfaces through the main control mechanism, any movement of the ailerons produced by the servo vanes will cause the appropriate movement of the main control mechanism and hence, when required, of the after control surfaces. In some cases therefore the main control mechanism may have no manually operable part but may simply constitute interconnecting mechanism between the ailerons and after control surface or surfaces through which the appropriate movements are transmitted from the outer ailerons when these are moved by the servo vanes.

When independent control means are provided for moving the outer ailerons with or without the after control surfaces and wing flaps to vary the effective camber of the wings, this mechanism may be connected to the servo control mechanism so that movement of the servo vanes is caused to assist the movement of the ailerons when the separate control means are operated.

The invention may be applied to biplanes but is particularly applicable to monoplanes and in either case the rear end of the body of the machine may terminate at or adjacent to the trailing edges of the central parts of the wings while the forward end of the body, in which the engine may be housed, projects only slightly in front of the forward edge of the inner parts of the wings and in some cases lies behind the leading edge of the outer parts of the wings.

The leading edges of the wings may sweep forward from their inner to their outer ends or may lie approximately at right angles to the direction of flight of the machine or even sweep slightly backwards provided that the shape of the wings in plan is such that the centre of pressure of the outer end portion of each wing lies in advance of the centre of gravity of the machine while the centre of pressure of the inner part of each wing lies in rear of this centre of gravity.

The inner parts of the two wings may be united to form, in effect, a single wing and in any case the tail elevator or tail plane, when provided, conveniently lies immediately behind and abuts against the trailing edge of the inner or central parts of the two main wings.

One construction according to the invention as applied to a monoplane is illustrated somewhat diagrammatically by way of example in the accompanying drawings, in which Figure 1 is a plan of one form of airplane according to the invention, Figure 2 is a front elevation of the airplane shown in Figure 1, Figure 3 illustrates diagrammatically one form of control mechanism which may be employed in the construction illustrated in Figures 1 and 2, and Figure 4 illustrates diagrammatically a servo control mechanism which may be employed with such construction.

In the construction illustrated, the airplane comprises two main wings A and B of deep section, the leading edges of which are swept forward from the body C, the wings being of tapered form in plan, as shown, so that the centre of pressure of each wing, which is indicated by the lines $A^1$, $B^1$, lies in advance of the centre of gravity at the outer end portions of the wings and in rear of this centre of gravity at the inner portions of the wings. Thus the line $a^2$ indicates the position in the length of the machine at which this centre of gravity lies. The wings, which are conveniently of the cantilever type, have ailerons $A^3$, $B^3$ pivoted to the trailing edges of their outer portions and wing flaps $A^4$, $B^4$ pivoted to the trailing edges of the portions lying immediately inside the ailerons, that is to say, the portions where the centre of pressure of the wings lies close to or in line with the centre of gravity of the machine.

Pivoted to the trailing edges of the extreme inner portions of the wings where they meet and may actually be joined together is a tail plane or elevator D.

For the purpose of increasing the inherent longitudinal stability of the machine the angle of incidence of the outer part of each wing is conveniently somewhat greater than that of the inner part while the inner parts of the wings, for example the parts in rear of the line X, may be shaped so as to exert little or no lifting effort but to act merely as a longitudinal stabilising surface.

Figure 3 illustrates main control mechanism which may be employed for the ailerons, the tail elevator and the wing flaps, irrespective of whether servo vanes with or without governing planes are provided or not on the ailerons.

The main control mechanism comprises a base plate E provided with bearing supports $E^1$ in which is mounted a transverse shaft $E^2$ adapted to be controlled and locked in any desired position by a lever $E^3$ rigidly secured to one end thereof and having hand release mechanism $E^4$ cooperating with a toothed rack $E^5$.

Rigidly secured to the shaft $E^2$ are two arms F the outer ends of which are formed to constitute bearings in which is rotatably mounted a transverse shaft $F^1$ carrying at its ends arms $F^2$ pivotally connected to control rods $F^3$ which are connected to the tail elevator D so as to control its movement. Freely surrounding the shaft $F^1$ are two sleeves G, $G^1$ carrying bevel wheels $G^2$ at their adjacent ends which mesh with a single bevel wheel $G^3$ carried by the lower end of a sleeve $G^4$ which is rotatably mounted on a vertical shaft $G^5$ the lower end of which is rigidly secured to the centre of the transverse shaft $F^1$. The upper end of the shaft $G^5$ carries a member $G^6$ constituting a bearing for a hand wheel H connected to a bevel wheel $H^1$ meshing with a bevel wheel $G^7$ on the upper end of the sleeve $G^4$.

The sleeves G, $G^1$ have rigidly connected thereto arms J, $J^1$ which are connected through links $J^2$, $J^3$ to arms $J^4$, $J^5$ rigidly secured to pulleys $J^6$, $J^7$ rotatably mounted on the base frame. Connected to the arms F through links K, $K^1$ are arms $K^2$, $K^3$ rigidly secured to pulleys $K^4$, $K^5$ also mounted in bearings in the base frame.

Cables $J^8$ and $J^9$ passing round the pulleys $J^6$, $J^7$ and over guide pulleys $J^{10}$ are connected respectively to the two ailerons $A^3$, $B^3$ as indicated. As regards the aileron $A^3$ it will be seen that with this arrangement rotation of the hand wheel H causes opposite rotation of the two sleeves G, $G^1$ which thus act through the arms J, $J^1$, links $J^2$, $J^3$, arms $J^4$, $J^5$, pulleys $J^6$, $J^7$ and cables $J^8$, $J^9$ to cause differential movement of the two ailerons $A^3$, $B^3$ for controlling lateral balance without moving the tail elevator D. If, however, the wheel H is moved bodily with the vertical shaft G⁸ in a fore and aft direction, so as to rock the shaft F¹ and the two sleeves G, G¹ bodily, the two ailerons A³, B³ will be moved together in the same direction and the tail elevator will be moved through the arms F² and rods F³ in the opposite direction to control longitudinal balance.

If the lever E³ is moved, the transverse shaft F¹ and the parts carried thereby will be moved vertically to cause movement of the two ailerons A³, B³ in the same sense and the pulleys K⁴, K⁵ will be moved by the links, K, K¹ and arms K², K³ to cause similar movement of the two wing flaps A⁴, B⁴ so as to vary the effective camber of the wings, no appreciable movement of the tail elevator taking place.

When servo vanes are provided on the ailerons A³, B³ these may be employed either alone or in conjunction with governing planes and one arrangement employing a governing plane A⁵ rigidly connected by struts to the aileron and carrying three servo vanes A⁶, A⁷, A⁷ is shown as applied to the outer aileron A³ in Figures 1, 3 and 4. It will be understood that a similar arrangement of governing plane and servo vanes would also be applied to the aileron B³.

In the construction shown the two servo vanes A⁷ are connected by control cables A⁸ to fixed points so that any movement of the aileron A³ will automatically cause an opposite movement of these servo vanes so that they assist movement of the aileron. The third servo vane A⁶ is however controlled by mechanism illustrated diagrammatically in Fig. 4.

This mechanism comprises a frame L which is mounted to rock about the axis of a pivot pin L¹ adapted to be supported in stationary bearings and is normally held from movement by mechanism comprising a link L² pivoted at one end to a lug L³ on the frame and at its other end to one arm of a bell crank lever L⁴ mounted to rock about a pivot L⁵ and controlled by a link L⁶ pivoted to its other arm. The link L⁶ may be controlled by a suitable lever capable of being locked in two or more positions, for example, by the lever E³ in Figure 3 as indicated.

Extending across and capable of rotation in bearings in the frame L is a spindle M on which are rotatably mounted two sleeves N, N¹ carrying bevel wheels N², N³. Each of the wheels N², N³ meshes with a central bevel wheel N⁴ rigidly mounted on a shaft N⁵ which is rotatably carried in bearings in a member N⁶ rigid with the spindle M. Rigidly connected to the shaft N⁵ is a control rod O the lower end of which carries a part O¹ in which is mounted to slide a locking bolt O² adapted to engage one or more holes in the part L⁷ of the frame L but to be released by a lever O³ through releasing mechanism comprising a rod O⁴ the lower end of which is pivoted to the lever O³ while its upper end is pivoted to a hand release member O⁵ lying adjacent to and adapted when gripped to form part of a knob O⁶ by which the control rod O can be rocked.

The sleeves N, N¹ carry arms P, P¹ pivotally connected to the upper ends of links P², P³ the lower ends of which are pivoted to arms P⁴, P⁵ rigidly connected to pulleys P⁶, P⁷ supported in fixed bearings (not shown). Control cables Q, Q¹ pass round the pulleys P⁶, P⁷, each control cable being led by guide pulleys, indicated at Q², through a hollow pivot Q³ on which the appropriate aileron A³ or B³ is mounted, to the servo vane so that rotational movement of either of the pulleys P⁶, P⁷ causes pivotal movement of the appropriate servo vane about the axis of the bearings at the trailing edge of the governing plane on which it is supported.

With this arrangement it will be seen that when the pilot grips the knob O⁶ so as to release the locking bolt O² sideways rocking movement of the control rod O will cause rotation of the bevel wheel N⁴ whereby the two sleeves N, N¹ will be rocked in opposite directions. This will cause rotation of the two pulleys P⁶, P⁷ in opposite directions, whereby the two servo vanes are moved in opposite directions and thus exert forces on the ailerons A³, B³ causing differential movement thereof for the purpose of controlling lateral balance. Backward and forward rocking movement of the control rod O on the other hand causes similar rotational movement of the two sleeves N, N¹ and hence similar rotational movement of the two pulleys P⁶, P⁷ so that the two servo vanes are caused to move in the same direction and thus to cause the ailerons A³, B³ to move in the same direction as one another but of course in the opposite sense to the movement of the servo vanes.

Movement of the frame L as a whole about the axis of its spindle L¹ by the mechanism L², L⁴, L⁶, E³ will also cause similar movement of the two pulleys P⁶, P⁷ and hence similar movement of the two servo vanes A⁶, B⁶ independently of any movement of the control rod O. Thus, when the lever E³ is moved, movement of the servo vanes will be cause to assist the movement imparted directly by the main control mechanism to the ailerons A³, B³ and wing flaps A⁴, B⁴.

When the control rod O is locked by the locking bolt O², pivotal movement of the servo vanes A⁶, B⁶ relatively to the ailerons A³, B³ will be prevented and it will then be seen that these servo vanes will form in effect extensions of the governing planes A⁵, B⁵ whereby any alteration in the angle of incidence of the air stream due, for example, to a variation in the longitudinal balance of the machine, will exert a force not only on the governing planes but also on the servo vanes A⁶, B⁶ tending to move the ailerons in such a way as to return the aircraft to its original condition of longitudinal balance. Thus, this assists the governing planes in effecting an automatic control of the aircraft which tends to maintain its longitudinal stability so as to assist or supplement its inherent longitudinal stability.

It will be understood that the arrangement is such that normally the servo vanes, and the governing planes when provided, lie in equilibrium in the air stream from the ailerons and thus, if the direction of this air stream varies from the normal due for example to the longitudinal balance of the machine varying or to its speed dropping, will exert a force on the ailerons tending to move them in such a direction as to restore the longitudinal balance.

It will be appreciated that if desired the two outer servo vanes A⁷ may be controlled by the servo-control mechanism while the central servo vane A⁶ is connected to a fixed part so as to be moved automatically when the aileron moves.

It is also to be understood that the servo vanes or the governing planes may be mounted directly on the trailing edges of the ailerons for example as indicated at B⁵ in Figure 1.

Preferably the ailerons and after control surface or surfaces and the main control mechanism and the servo-control mechanism when provided form a statically balanced system so that there will be no tendency for the movement of the parts thereof under the action of gravity, or otherwise than under the control of the pilot or under the action of air on the governing planes or servo vanes. Thus, one or more counterweights may be provided, for example, below the shaft F¹ of the main control mechanism and the parts carried thereby so that this mechanism shall not tend to move under its own weight whatever its position.

It will be understood that in some cases governing planes may be dispensed with and somewhat larger servo vanes pivoted directly to the ailerons or to struts rigid therewith and that in any case each outer aileron may be provided with only a single servo vane controlled either automatically with movement of the aileron or by mechanism under the control of the pilot. Again in some cases governing planes without servo vanes may be provided, in which case the governing planes will, when a variation from the normal angle of incidence occurs due to a change in the longitudinal balance of the machine, tend automatically to move the ailerons so as to restore normal longitudinal balance.

What I claim as my invention and desire to secure by Letters Patent is:

1. An airplane including in combination main wings having parts where the centre of pressure is in advance of the centre of gravity and parts where the centre of pressure is in rear of the centre of gravity of the airplane, ailerons on the trailing edges of parts of the main wings where the centre of pressure is in advance of the centre of gravity, and governing planes rigidly connected to the trailing edges of the ailerons so as normally to lie in equilibrium in the air stream.

2. An airplane including in combination main wings having parts where the centre of pressure is in advance of the centre of gravity and parts where the centre of pressure is in rear of the centre of gravity of the airplane, ailerons on the trailing edges of parts of the main wings where the centre of pressure is in advance of the centre of gravity, governing planes rigidly connected to the trailing edges of the ailerons so as normally to lie in equilibrium in the air stream, an after control surface situated in rear of the centre of gravity, and an interconnection between the ailerons and the after control surface such that when the ailerons move in the same sense the after control surface is automatically moved in the opposite sense.

3. An airplane including in combination main wings having parts where the centre of pressure is in advance of the centre of gravity and parts where the centre of pressure is in rear of the centre of gravity of the airplane, ailerons on the trailing edges of parts of the main wings where the centre of pressure is in advance of the centre of gravity, governing planes rigidly connected to the trailing edges of the ailerons so as normally to lie in equilibrium in the air stream, and an interconnection between the ailerons such that when one aileron has a force applied thereto moving it in one sense the other aileron automatically has a force applied thereto moving it in the opposite sense.

4. An airplane including in combination main wings having parts where the centre of pressure is in advance of the centre of gravity and parts where the centre of pressure is in the rear of the centre of gravity of the airplane, ailerons on the trailing edges of parts of the main wings where the centre of pressure is in advance of the centre of gravity, governing planes rigidly connected to the trailing edges of the ailerons so as normally to lie in equilibrium in the air stream, an after control surface situated in rear of the centre of gravity, and interconnecting mechanism between the ailerons and the after control surface such that when the ailerons are moved in the same sense the after control surface is automatically moved in the opposite sense whereas if one aileron has a force applied thereto moving it in one sense the other aileron has a force applied thereto moving it in the opposite sense.

5. An airplane including in combination main wings having parts where the centre of pressure is in advance of the centre of gravity and parts where the centre of pressure is in rear of the centre of gravity of the airplane, ailerons on the trailing edges of parts of the main wings where the centre of pressure is in advance of the centre of gravity, governing planes rigidly connected to the trailing edges of the ailerons so as normally to lie in equilibrium in the air stream, an after control surface situated in rear of the centre of gravity, interconnecting mechanism between the ailerons and the after control surface such that when the ailerons are moved in the same sense the after control surface is automatically moved in the opposite sense whereas if one aileron has a force applied thereto moving it in one sense the other aileron has a force applied thereto moving it in the opposite sense, servo vanes pivotally connected to the trailing edges of the governing planes, operating mechanism for controlling the movements of the servo vanes, and means for locking the operating mechanism for the servo vanes so as to hold them from movement relatively to the ailerons.

6. An airplane including in combination main wings the centre of pressure of the outer part of each of which lies in advance of the centre of gravity while the centre of pressure of the inner part lies in rear of the centre of gravity, ailerons on the trailing edges of the outer parts of the wings, and governing planes rigidly connected to the trailing edges of the ailerons so as normally to lie in equilibrium in the air stream.

7. An airplane including in combination main wings the centre of pressure of the outer part of each of which lies in advance of the centre of gravity while the centre of pressure of the inner part lies in rear of the centre of gravity, ailerons on the trailing edges of the outer parts of the wings, governing planes rigidly connected to the trailing edges of the ailerons so as normally to lie in equilibrium in the air stream, an after control surface situated in rear of the centre of gravity, and an interconnection between the ailerons and the after control surface such that when the ailerons move in the same sense the after control surface is automatically moved in the opposite sense.

8. An airplane including in combination main wings the centre of pressure of the outer part of each of which lies in advance of the centre of gravity while the centre of pressure of the inner part lies in rear of the centre of gravity, ailerons on the trailing edges of the outer parts of the wings, governing planes rigidly connected to the trailing edges of the ailerons so as normally to lie in equilibrium in the air stream, an after control surface situated in rear of the centre of gravity, an interconnection between the ailerons and the after control surface such that when the ailerons move in the same sense the after control surface is automatically moved in the opposite sense, servo vanes pivoted to the rear edges of the governing planes, and independent control mechanism for the servo vanes.

9. An airplane including in combination main wings the centre of pressure of the outer part of each of which lies in advance of the centre of gravity while the centre of pressure of the inner part lies in rear of the centre of gravity, ailerons on the trailing edges of the outer parts of the wings, governing planes rigidly connected to the trailing edges of the ailerons so as normally to lie in equilibrium in the air stream, an after control surface situated in rear of the centre of gravity, an interconnection between the ailerons and the after control surface such that when the ailerons move in the same sense the after control surface is automatically moved in the opposite sense, servo vanes pivoted to the rear edges of the governing planes, independent control mechanism for the servo vanes, means for locking the servo vane control mechanism, wing flaps on parts of the wings where the centre of pressure is adjacent to or in rear of the centre of gravity, control mechanism for the wing flaps and an interconnection between the control mechanism for the wing flaps and the control mechanism for the servo vanes such that when the wing flaps are moved in one sense the servo vanes are moved to assist movement of the ailerons in the same sense irrespective of the operation of the means for locking the servo vane control mechanism.

WILLIAM EDWARD BACK.